US008892472B2

(12) United States Patent (10) Patent No.: US 8,892,472 B2
Welingkar et al. (45) Date of Patent: Nov. 18, 2014

(54) SYSTEM AND METHOD FOR FACILITATING THE LENDING OF DIGITAL CONTENT USING CONTACTS LISTS

(75) Inventors: Bharat Welingkar, Los Altos, CA (US); Thorsten Kuehnemund, Redwood City, CA (US)

(73) Assignee: barnesandnoble.com llc, New York, NY (US)

( * ) Notice: Subject to any disclaimer, the term of this patent is extended or adjusted under 35 U.S.C. 154(b) by 219 days.

(21) Appl. No.: 13/252,115

(22) Filed: Oct. 3, 2011

(65) Prior Publication Data

US 2012/0179753 A1 Jul. 12, 2012

Related U.S. Application Data

(60) Provisional application No. 61/406,857, filed on Oct. 26, 2010.

(51) Int. Cl.
*G06F 21/00* (2013.01)
*G06Q 30/06* (2012.01)

(52) U.S. Cl.
CPC ........ *G06Q 30/0645* (2013.01); *G06Q 30/0601* (2013.01)
USPC .............................................. 705/54; 705/59

(58) Field of Classification Search
USPC ................... 705/51, 57, 80, 54, 59; 709/204; 455/3.02; 380/285; 378/4
See application file for complete search history.

(56) References Cited

U.S. PATENT DOCUMENTS

| 4,855,725 A | 8/1989 | Fernandez |
| 4,899,299 A | 2/1990 | MacPhail |
| 4,924,378 A | 5/1990 | Hershey et al. |
| 5,014,234 A | 5/1991 | Edwards, Jr. |
| 5,109,413 A | 4/1992 | Comerford et al. |
| 5,457,746 A | 10/1995 | Dolphin |
| 5,598,470 A | 1/1997 | Cooper et al. |

(Continued)

FOREIGN PATENT DOCUMENTS

| JP | 09147029 A | 6/1997 |
| JP | 11039263 A | 2/1999 |

(Continued)

OTHER PUBLICATIONS

International Search Report and Written Opinion for PCT Application No. PCT/US2011/54651, dated Dec. 23, 2011.

(Continued)

*Primary Examiner* — Le H Luu
(74) *Attorney, Agent, or Firm* — Winston & Strawn LLP (57) ABSTRACT

A system and method for lending digital content in which a user employs her contacts list to lend and borrow the digital content. The lender initiates the lending process using her local device by generating a lending offer. The lending offer contains an identification of the lender, an identification of the contact and an identification of the digital content to be lent. The lending offer is communicated from the lender's local device through a communication channel to a server which generates a lending offer email and/or a lending notification. The lending offer email and notification are sent to the potential lendee. The potential lendee can click on a URL contained in the email or respond to the lending offer notification to accept the loan. The server processes this acceptance by the lendee and transfers the loaned copy of the digital content to the lendee.

17 Claims, 9 Drawing Sheets

(56) References Cited

U.S. PATENT DOCUMENTS

| | | |
|---|---|---|
| 5,734,891 A | 3/1998 | Saigh |
| 5,764,972 A | 6/1998 | Crouse et al. |
| 6,901,386 B1 | 5/2005 | Dedrick et al. |
| 7,054,840 B1 | 5/2006 | Foth et al. |
| 7,200,575 B2 | 4/2007 | Hans et al. |
| 7,231,370 B1 | 6/2007 | Kapur |
| 7,299,498 B2 | 11/2007 | Lee et al. |
| 7,299,501 B2 | 11/2007 | Hendricks |
| 7,814,025 B2 | 10/2010 | Roever et al. |
| 7,917,965 B2 | 3/2011 | Manning et al. |
| 8,364,595 B1 | 1/2013 | Ringewald |
| 8,627,500 B2 | 1/2014 | Rogel et al. |
| 2002/0019943 A1 | 2/2002 | Cho et al. |
| 2002/0026445 A1 | 2/2002 | Chica et al. |
| 2002/0083178 A1 | 6/2002 | Brothers |
| 2002/0152173 A1* | 10/2002 | Rudd ............................. 705/57 |
| 2003/0004885 A1 | 1/2003 | Banerjee et al. |
| 2003/0078888 A1 | 4/2003 | Lee et al. |
| 2004/0199471 A1 | 10/2004 | Hardjono |
| 2005/0137984 A1 | 6/2005 | Nguyen et al. |
| 2005/0219664 A1 | 10/2005 | Niwa |
| 2006/0036548 A1* | 2/2006 | Roever et al. ................... 705/51 |
| 2006/0143134 A1 | 6/2006 | So et al. |
| 2006/0253398 A1 | 11/2006 | Kim et al. |
| 2007/0112676 A1 | 5/2007 | Kontio et al. |
| 2007/0219917 A1 | 9/2007 | Liu et al. |
| 2007/0265977 A1 | 11/2007 | Read |
| 2007/0283420 A1 | 12/2007 | Rantalahti |
| 2008/0114729 A1 | 5/2008 | Raman et al. |
| 2008/0148069 A1 | 6/2008 | Tsuria et al. |
| 2008/0178001 A1 | 7/2008 | Kim et al. |
| 2009/0049556 A1 | 2/2009 | Vrielink et al. |
| 2009/0165124 A1 | 6/2009 | Spektor |
| 2009/0216623 A1 | 8/2009 | Hendricks et al. |
| 2009/0228395 A1 | 9/2009 | Wegner et al. |
| 2009/0260067 A1 | 10/2009 | Racabi |
| 2009/0281953 A1* | 11/2009 | Ruskowski ..................... 705/80 |
| 2010/0067705 A1* | 3/2010 | Boccon-Gibod et al. ..... 380/285 |
| 2010/0106659 A1 | 4/2010 | Stefik et al. |
| 2010/0191770 A1 | 7/2010 | Cho et al. |
| 2010/0262515 A1 | 10/2010 | Brewer |
| 2010/0322373 A1* | 12/2010 | Churilla ............................ 378/4 |
| 2011/0016182 A1 | 1/2011 | Harris |
| 2011/0143650 A1* | 6/2011 | Robinson .................... 455/3.02 |
| 2012/0090019 A1 | 4/2012 | Messerges et al. |
| 2012/0179753 A1* | 7/2012 | Welingkar et al. ............. 709/204 |

FOREIGN PATENT DOCUMENTS

| | | |
|---|---|---|
| JP | 2002189958 A | 7/2002 |
| JP | 2002259739 A | 9/2002 |
| JP | 2003186751 A | 7/2003 |
| JP | 2003186982 A | 7/2003 |
| JP | 2005316990 A | 11/2005 |
| JP | 2006134348 A | 5/2006 |
| JP | 2006522413 A | 9/2006 |
| JP | 200852663 A | 3/2008 |
| WO | WO93/01550 A1 | 1/1993 |
| WO | WO93/09490 A1 | 5/1993 |
| WO | WO2004/093062 A2 | 10/2004 |

OTHER PUBLICATIONS

Web Article: Hugo Hallman, Rationalizing access checks with HMAC:ed URLs, http:/www.codeproject.com/Articles/8576/Rationalizing-access-checks-with-HMAC-ed-URLs, Oct. 16, 2004.

U.S. Appl. No. 13/154,350, Non-Final Office Action, dated Nov. 8, 2012.

U.S. Appl. No. 13/154,350, Final Office Action, dated Aug. 30, 2013.

* cited by examiner

SYSTEM AND METHOD FOR FACILITATING THE LENDING OF DIGITAL CONTENT USING CONTACTS LISTS

CROSS REFERENCE TO RELATED APPLICATION

This application claims benefit under 35 U.S.C. §119(e) from U.S. Provisional Patent application No. 61/406,857, filed on Oct. 26, 2010, the entirety of which is incorporated by reference herein.

FIELD OF THE INVENTION

The present invention generally relates to systems and methods for lending digital content items, and more particularly to systems and methods for lending digital content items using a contact list or social networks.

BACKGROUND OF THE INVENTION

Publishers have legitimate business and legal concerns regarding digital content lending systems. Unlike paper copies of their book content, copies of digital content are relatively easy to make and very easy to distribute. To meet business concerns, publishers require that a lending system ensures that only one user at a time has access to the ebook content purchased by a user. To meet legal concerns, publishers require that a lending system does not permit the duplication of multiple copies of ebook content in violation of copyright law.

There are library-based lending systems in use that allow an ebook to be lent from a library to a patron of the library (see for example the ebook lending system at the New York Public Library (ebooks.nypl.org)). A library-based lending system is not a consumer-to-consumer lending system and differs in several significant regards. In a library lending system, a library patron submits a request to the library for a book contained in the library. The requests for books are always between patrons and the library system itself. There is no lending between patrons of the library system. Current library-based lending systems do not have the technical capability to facilitate a lending process directly between one user and another user.

U.S. Pat. No. 6,901,386 describes a system by which corporations or other entities can manage their licenses to electronic assets, e.g., software. As is well known, software licenses, particularly licenses to enterprise software, can be very expensive. Corporations are therefore always looking for ways to maximize the use of their licenses across the organization. In the system described in this patent, the owner of a current license to an electronic asset "releases" its license to the license management system. This released license can be re-assigned other users in the organization.

U.S. Pat. No. 7,054,840 describes a clearinghouse for rights in digital material. If a user decides to sell or otherwise transfer her rights to some digital material, she transfers her rights to a clearinghouse server which posts the digital material as being for sale or other transfer. When a buyer or borrower sees the posting, he can buy or borrow the material through the clearinghouse.

U.S. Patent Publication US 2006/10543134 describes a licensing system in which a request for a license is received either directly from a borrower or indirectly through a licensing authority.

None of these systems of the prior art describe a consumer to consumer lending system that provides the technical safeguards required by authors and publishers to ensure unauthorized copies are not made. Further none of them teach a system in which a user's electronically stored contacts facilitate the lending and borrowing of digital content.

SUMMARY OF THE INVENTION

The lending system of the present invention enables a user to employ her contact list to facilitate the lending and borrowing of digital content. In a preferred embodiment, the digital content is electronic books. As a lender, the user can use her contact list to easily identify and send a lending notification to one of her contacts. On the borrowing side, a borrower can use the system to scan the books that her contacts have available for lending and make a lend request.

In order to initiate a loan of digital content, the lender, using her local device, generates a lending offer. The lending offer contains an identification of the lender, an identification of the contact and an identification of the digital content to be lent. Optionally, the lending offer can contain a personal message from the lender to the contact (potential lendee). The identification of the lendee can be the lendee's email address obtained from the lender's contact list. Optionally, it can be a user id at a social network such as a Facebook™. The lending offer is communicated from the lender's local device through a communication channel such as the Internet or a telephone (cellular) network to a server of the present invention. The server processes the lending offer from the lender and generates a lending offer email and, if the potential lendee is an authorized user of the system, a lending notification. The lending offer email is sent by traditional email methods, and the lending notification is transmitted to the potential lendee next time he logs connects to the system with his local device. The lending offer email contains a combination of a lending offer ID and an encrypted security hash code that uniquely identifies the lending offer. Similarly, the lending offer notification through the system is linked to the lending offer.

The potential lendee can click on the URL contained in the email or respond to the lending offer notification to accept the loan. The server processes this acceptance by the lendee and transfers the loaned copy of the digital content to the lendee. In a preferred embodiment, both the lending offer and period of loan of the digital content is time limited and expires after a predetermined time.

On the borrowing side, the system of the present invention allows a user to view the digital content, ebooks, that her contacts have available for loan. The user can search by contacts or by a title of a particular book she would like to borrow. If the user finds a book she would like to loan, she can select the contact and the book and her local device generates a loan request. The loan request is processed by the server and forwarded to the contact by email and/or notification. The recipient of the loan request is then able to execute the loan process as described above.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
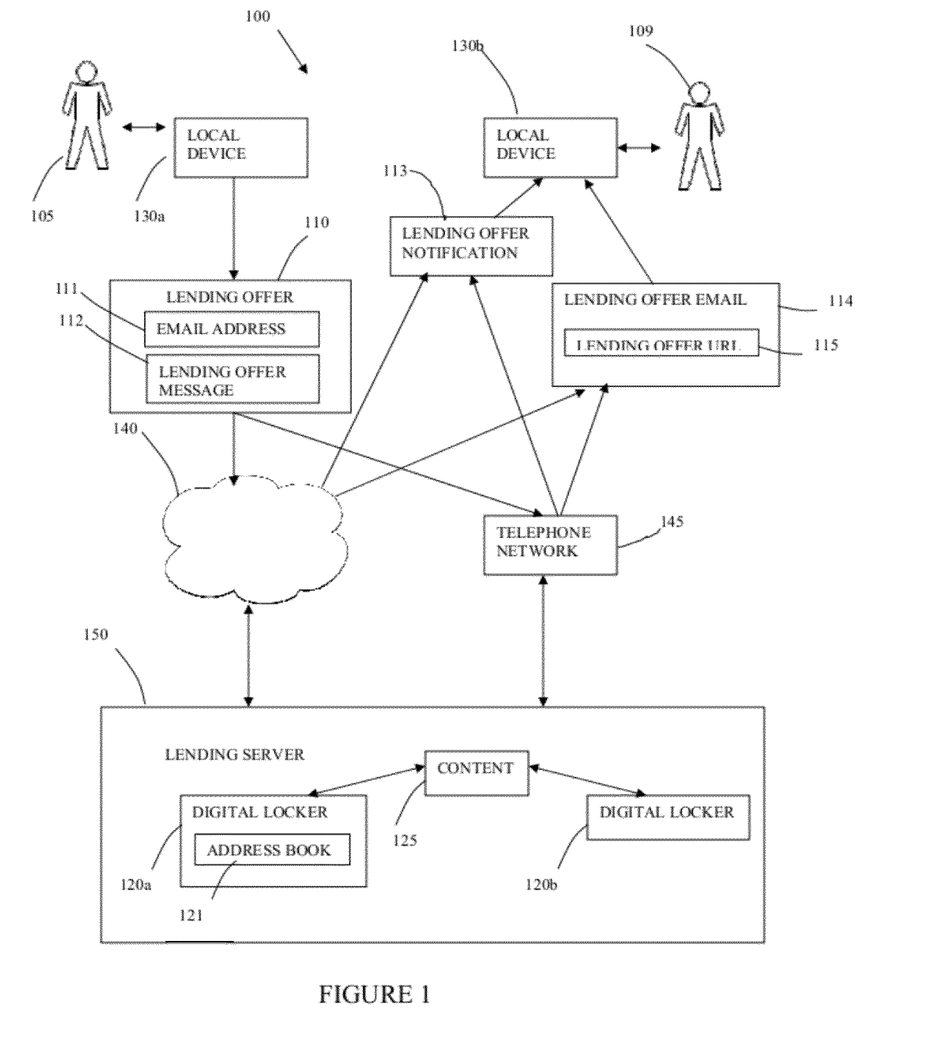
FIG. 1 illustrates the system and data flow of the present invention.

FIG. 1 shows components of a lending system 100 according to the present invention. Lender 105 is an authorized user of lending system 100 and uses her local device 130a to facilitate the lending of her digital content. Many of the functions of lending system 100 of the present invention are carried out on lending server 150. As appreciated by those skilled in the art, many of the functions described herein can be divided between the lending server 150 and the user's local device 130a. Further, as also appreciated by those skilled in the art, lending server 150 can be considered a "cloud" with respect to the user and her local device 130a. The cloud can actually be comprised of several servers performing interconnected and distributed functions. For the sake of simplicity in the present discussion, only a single server 150 will be described. The lender 105 can connect to the lending server 150 via the Internet 140, a telephone network 145 (e.g., wirelessly through a cellphone network) or other suitable electronic communication means. Lender 105 has an account on lending server 150, which authorizes lender 105 to use lending system 100.

Associated with the lender's 105 account is the lender's 105 digital locker 120a located on the lending server 150. As further described below, in the preferred embodiment of the present invention, digital locker 120a contains links to copies of digital content 125 previously purchased (or otherwise legally acquired) by lender 105. Some of the digital content 125 purchased by lender 105 is digital content 125 with lending rights. For the digital content 125 with lending rights, lender 105 is allowed to lend lender's 105 copy of digital content 125 to another authorized user of lending system 100.

Indicia of rights to all copies of digital content 125 owned by lender 105, including digital content 125, is stored by reference in digital locker 120a. Digital locker 120a is a remote online repository that is uniquely associated with the lender's 105 account. As appreciated by those skilled in the art, the actual copies of the digital content 125 are not necessarily stored in the user's locker 120a, but rather the locker 120a stores an indication of the rights of the user to the particular content 125 and a link or other reference to the actual digital content 125. Typically, the actual copy of the digital content 125 is stored in another mass storage (not shown). The digital lockers 120 of all of the lenders 105 who have purchased a copy of a particular digital content 125 would point to this copy in mass storage. Of course, back up copies of all digital content 125 are maintained for disaster recovery purposes. Although only one example of digital content 125 is illustrated in this Figure, it is appreciated that the lending server 150 can contain millions of files 125 containing digital content. It is also contemplated that the lending server 150 can actually be comprised of several servers with access to a plurality of storage devices containing digital content 125. As further appreciated by those skilled in the art, in conventional licensing programs, the user does not own the actual copy of the digital content, but has a license to use it. Hereinafter, if reference is made to "owning" the digital content, it is understood what is meant is the license or right to use the content.

Also contained in the lender's digital locker 120a is her address book 121, i.e., her contacts list. As described further below in connection with FIG. 4, the actual contacts can be stored in an Address Book Database 250. As with traditional address books, the address book 121 of the present invention contains the contact's name and email addresses. The address book 121 is capable of storing multiple email addresses for each contact. In addition, the address book 121 contains an indication of whether the contact is also an authorized (registered) user of the system 100 with his or her own account on server 150.

Lender 105 can access his or her digital locker 120a using a local device 130a. Local device 130a is an electronic device such as a personal computer, an e-book reader, a smart phone or other electronic device that the lender 105 can use to access the lending server 150. In a preferred embodiment, the local device has been previously associated (registered) with the lender's 105 account using lender's 105 account credentials. Local device 130a provides the capability for lender 105 to download lender's 105 copy of digital content 125 via his or her digital locker 120a. After digital content 125 is downloaded to local device 130a, lender 105 can engage with the downloaded content locally, e.g., read the book, listen to the music or watch the video.

In a preferred embodiment, local device 130a includes a non-browser based device lending interface that allows lender 105 to initiate the lending of digital content 125 to another authorized user of lending system 100 in a non-browser environment. Through the device lending interface, the lender 105 is automatically connected to the lending server 150 in a non-browser based environment. This connection to the lending server is a secure interface and can be through the telephone network 145, typically a cellular network for mobile devices. If lender 105 is accessing his or her digital locker 120a using the Internet 140, local device 130a also includes a web account interface. Web account interface provides lender 105 with browser-based access to his or her account and digital locker 120a over the Internet 140. The web account interface also includes web lending interface similar to the device lending interface of the non-browser embodiment. Web lending interface allows lender 105 to initiate the lending of digital content 125 to another authorized user of lending system 100 in a browser based environment.

Lendee 109 is also preferably an authorized user of lending system 100. As with lender 105, lendee 109 has an account with lending server 150, which authorizes lendee 109 to use lending system 100. Lendee 109 can be the recipient of a loaned copy of digital content 125 from lender 105. Indicia of rights to digital content 125 that is lent to lendee 109 and indicia of rights to any other copies of digital content owned by lendee 109 are stored by reference in her digital locker 120b. As with lender 105, lendee 109 can access his or her digital locker 120b using her local device 130b. In a preferred embodiment, local device 130b is a device that lendee 109 has previously associated (registered) with his or her account using lendee's 109 account credentials. Local device 130b allows lendee 109 to download a copy of loaned digital content 125 from digital locker 120b once the copy of digital content 125 is successfully lent from lender 105. Lendee 109 can engage with downloaded lent digital content 125 locally on local device 130b. Local device 130b also includes a device lending interface. Device lending interface allows lendee 109 to respond to lending offer notifications.

Lendee 109 can also access his or her digital locker 120b using a browser based web account interface. Web account interface provides lendee 109 with browser-based access to his or her account and digital locker 120b over the Internet 140. Web account interface also provides lendee 109 with access to web lending interface. Web lending interface allows lendee 109 to respond to lending offer emails as further described below.

As shown in FIG. 1, lender 105 can initiate an electronic lending offer 110 to lend digital content 125 to lendee 109. As further described below, when processed by the lending server 150, a lending offer 110 initiated by lender 105 is linked to the digital content 125 to be loaned and linked to lender 105 via her digital locker 120a.

Figure 2A:
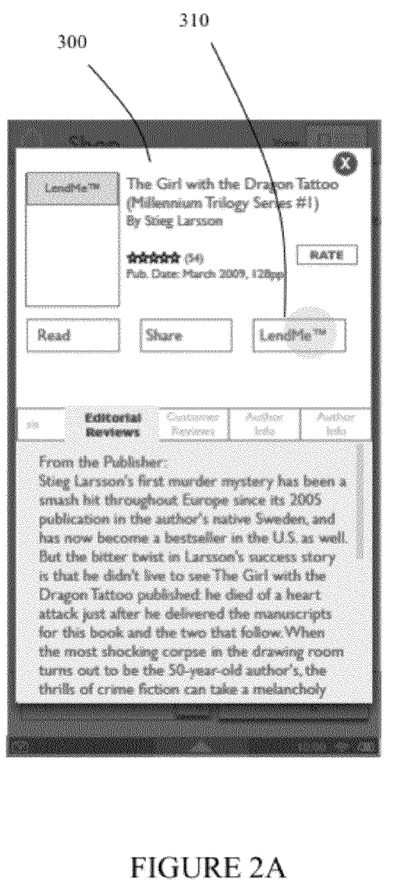
FIGS. 2A-2D depict a user using her contacts list to identify a lendee.
Figure 2B:
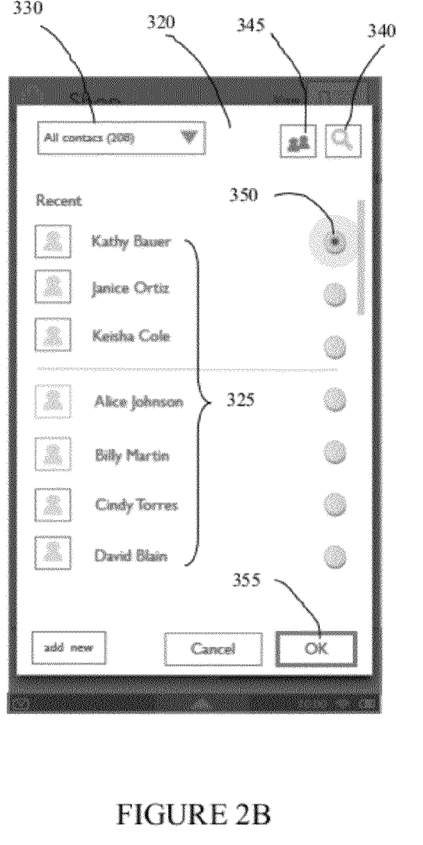

Although lender 105 can initiate the lending process from several applications in her local device 130a, a typical place is when the lender 105 is actually viewing particular book 125. FIGS. 2A-2D show an exemplary embodiment of this user interface. As shown in FIG. 2A, the detail summary 300 of lender's book 125 includes a LendMe button 310. If lender taps (clicks) on the LendMe button 310, her contacts list 320 is brought up as illustrated in FIG. 2B. Lender 105 is able to scroll and search her contact list 320 to find the particular contact 325 to which she wants to extend the lending offer. Lender 105 can use dropdown box 330 to filter her contacts according to predefined criteria. The search button 340 can be used to search for specific contacts 325. Button 345 is an icon for the user's friends. Tapping on button 345 will show all the user's contacts that also have accounts on server 150. Lender 105 uses button 350 to select the particular contact to which she would like to send the lending offer 110 and clicks the OK button 355 to make the selection and proceed with the process of making the lending offer 110 to the selected contact.

Figure 2C:
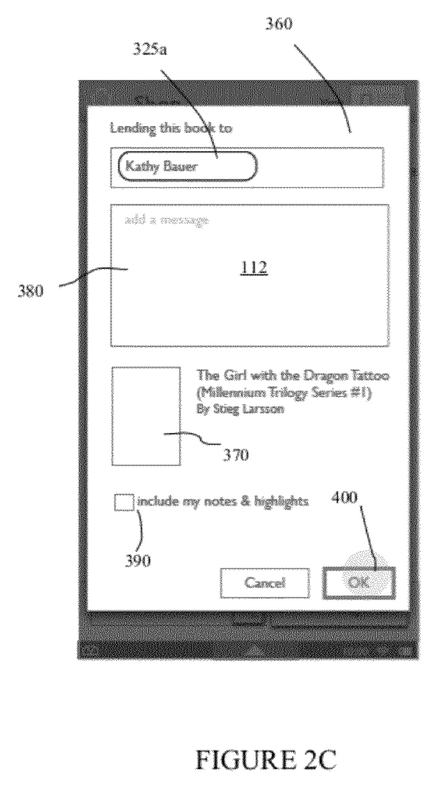
Figure 2D:
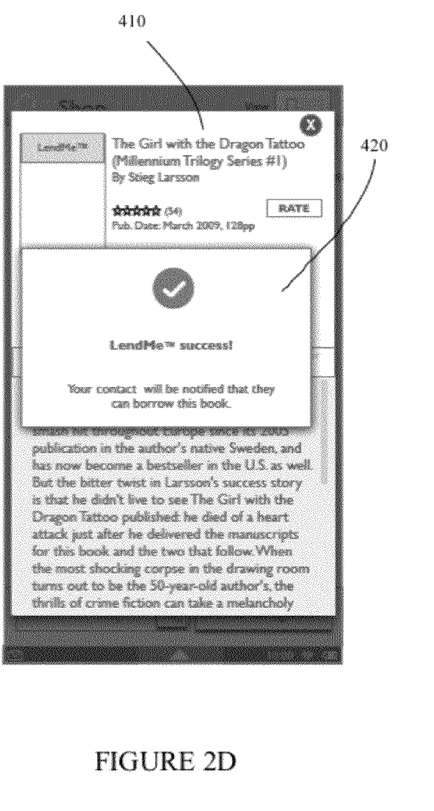

As shown in FIG. 2C, after a particular contact 325a has been chosen, the contact 325 (potential lendee 109) and book 370 to be lent is confirmed on the user interface 360. Additionally, the lender 105 can type a message 112 in area 380 that will be included in the email containing the lending offer 110. Lender 150 can also select option 390 to include in the lent book all of the notes and highlights that lender 105 has made to her electronic copy of the book to be lent. If the lender 105 confirms that the selected contact 325a and the book 370 to be lent is correct, she selects the OK button 400 to continue the lending process. A confirmation message 420 is displayed on user interface 410 to inform lender 105 that the lending offer 110 will be sent to the selected contact 325a (potential lendee 109).

Returning to FIG. 1, the lending offer 110 may include informational details about the lender 105, e.g., her name, and the content 125 to be loaned, such as the title of the item 125. Lending offer 110 preferably includes an email address 111 of lendee 109 and a lending offer message 112. The email address 111 is an unconfirmed email address of lendee 109 that is retrieved from lender's address book as described above. Lending offer message 112 is an optional message entered by lender 105 (e.g., "Hi, I think you'll like this book").

In the non-browser embodiment, email address 111 is used by the lending server 150 to identify the potential lendee 109 in order to deliver a lending offer notification 113 to lendee 109 on local device 130b. In order to receive lending offer notification 113, lendee 109 must be an authorized user of server 150. The lending offer notification 113 will be received by the lendee 109 the next time she logs onto her account on the lending server 150. Email address 111 is also used to deliver lending offer email 114 directly to lendee's 109 email account. Lending offer email 114 can be sent to either authorized user of lending server 150, or people who have never been affiliated with server 150. Lending offer notification 113 is an alert delivered by lending system 150 to lendee 109 which lendee 109 receives and can respond to using device lending interface in his or her local device 130b. Lending offer email 114 is an email delivered to email address 111 that lendee 109 receives via his or her email system. The lendee 109 can respond to the lending offer email 114 via a Uniform Resource Locator (URL) contained in the email offer 114.

Figure 3:
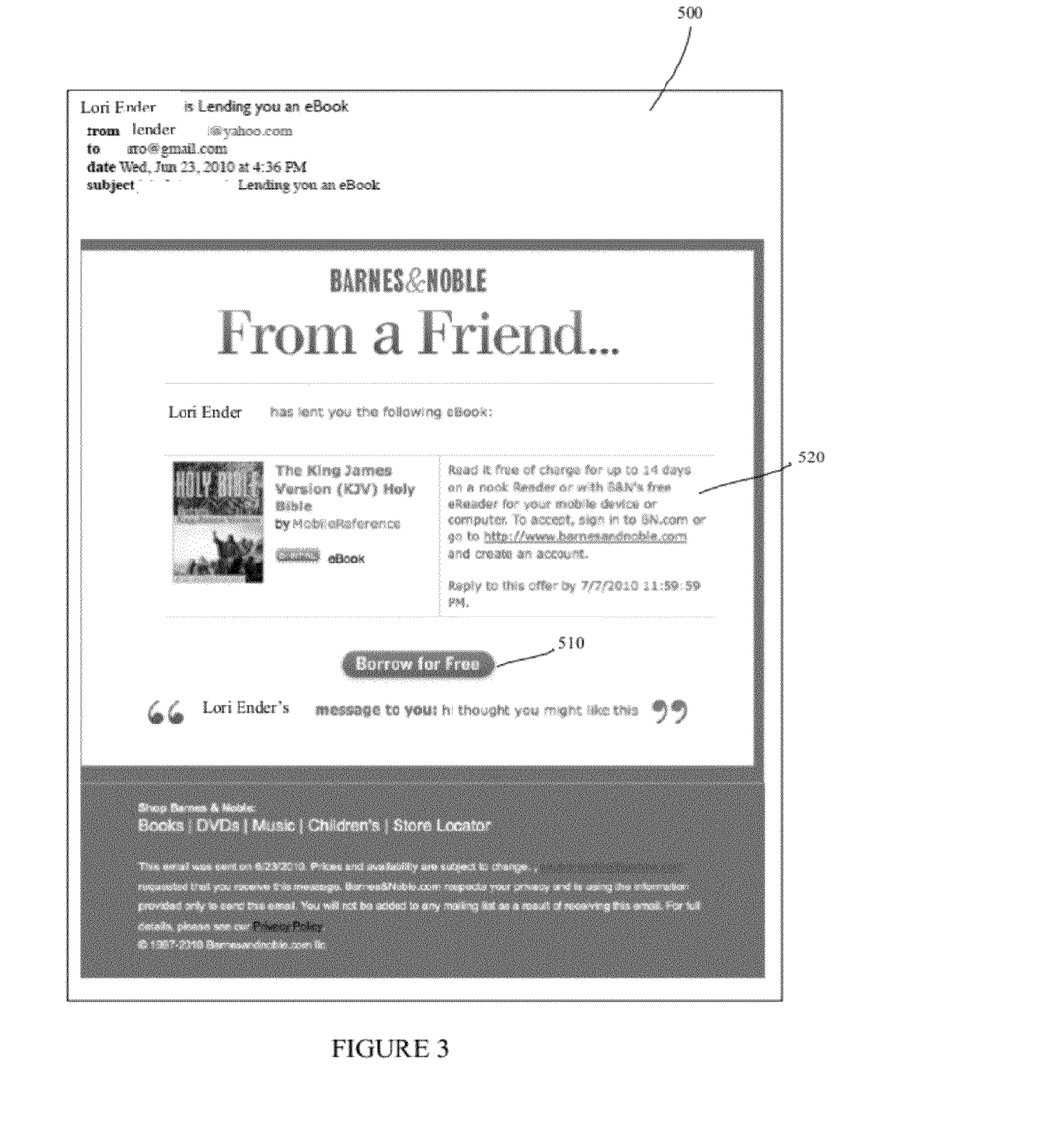
FIG. 3 illustrates a lending offer email.

FIG. 3 illustrates an exemplary user interface 500 presenting lending offer email 114 that is sent by server 150 and received by lendee 109 on her email system. Lending offer email 114 contains a lending offer URL 115 that is embedded in button 510 on interface 500. Lending offer URL 115 contains a combination of a lending offer ID and an encrypted security hash code, each of which is generated by lending server 150 and uniquely identifies the lending offer 110 from lender 105. This combination of parameters in the lending offer URL 115 is used to verify that an incoming request to respond to lending offer 110 over the Internet 140 matches an existing, valid, unexpired lending offer 110. This feature provides security for intentional or unintentional hacking of the system and prevents unauthorized access to digital content 125.

Lending server 150 manages the receipt of the lending offer 110 from lender 105 and initiates the generation and delivery of lending offer notification 113, and lending offer email 114 to lendee 109. Lending server 150 is also capable of receiving lending offers 110 from lender 105 that are intended for a proposed lendee 109 that is not already an authorized user of the system (i.e. proposed lendee does not have an account established on lending server 150). In this embodiment of the present invention, lending server 150 only sends the lending offer email 114 to the proposed lendee. In order to accept the lending offer, the proposed lendee must log onto the system and register with the lending system and thus become an authorized lendee 109. As seen in FIG. 3, area 520 is an invitation to a non-registered potential lendee 109 to sign onto server 150, create an account, and be the recipient of the lent book.

Similar to the email lending offer notification process described above, the system 100 of the present invention is able to communicate lending offers via other social networks. For example, if one of lender's 105 contacts is indicated in lender's address book as having a Facebook™ user ID, when the lender 105 selects this lendee to extend a lend offer via Facebook™, the system 100 is capable of creating a feed story on Facebook™ directed at the selected lendee. Prior to making the lending offer, the lendee 105 has authorized the system to act on her behalf when interacting with these social networks. When the lendee 105 makes the lending offer 110 and it is received by server 150, server 150 logs onto the applicable social network as the lender 105 (according to established protocol) and posts the lending offer 110. Specifically with respect to Facebook™, the lender 105 selects the potential lendee's Facebook™ user ID form her contacts list and her local device 130a incorporates the lendee's Facebook™ user ID into lending offer 110. Thus upon receipt of the lending offer 110 from lender 105, server 150 is able to post the lending offer 110 on the lendee's Facebook™ wall as a news feed from the lender.

The story/message posted on Facebook™ by lending server 150 contains the URL 115 as described above which allows the lendee to be directed back to server 150. In the case of a social network such as Facebook™ (in contrast to the URL 115 embedded in the ending offer email 114), the URL 115 will also be encrypted with the lendee's Facebook™ user ID. Server 150 is thus able to confirm that the URL 115 corresponds to the legitimate, unexpired lending offer 110 and the person responding to the offer (the one that clicked on the link) is the lendee. The server 150 confirms that person responding to the offer by clicking on the link on the Facebook™ wall is logged onto the social network with the user ID of the lendee. As most areas of the social networks are often publically accessible (e.g., the user's wall in Facebook™), this mechanism ensures that only the intended lendee, logged onto the social network under their user ID, was the one that activated the URL 115. Any other user clicking on the URL 115 while viewing the lendee's wall on Facebook™ will be rejected by server 150.

If the Facebook™ lendee is also a registered user of system 100, she merely logs on to server 150 to accept the loan offer 110. If she is not a registered user, she is invited to become a registered user as described above so that she can accept the loan offer 110.

Figure 4:
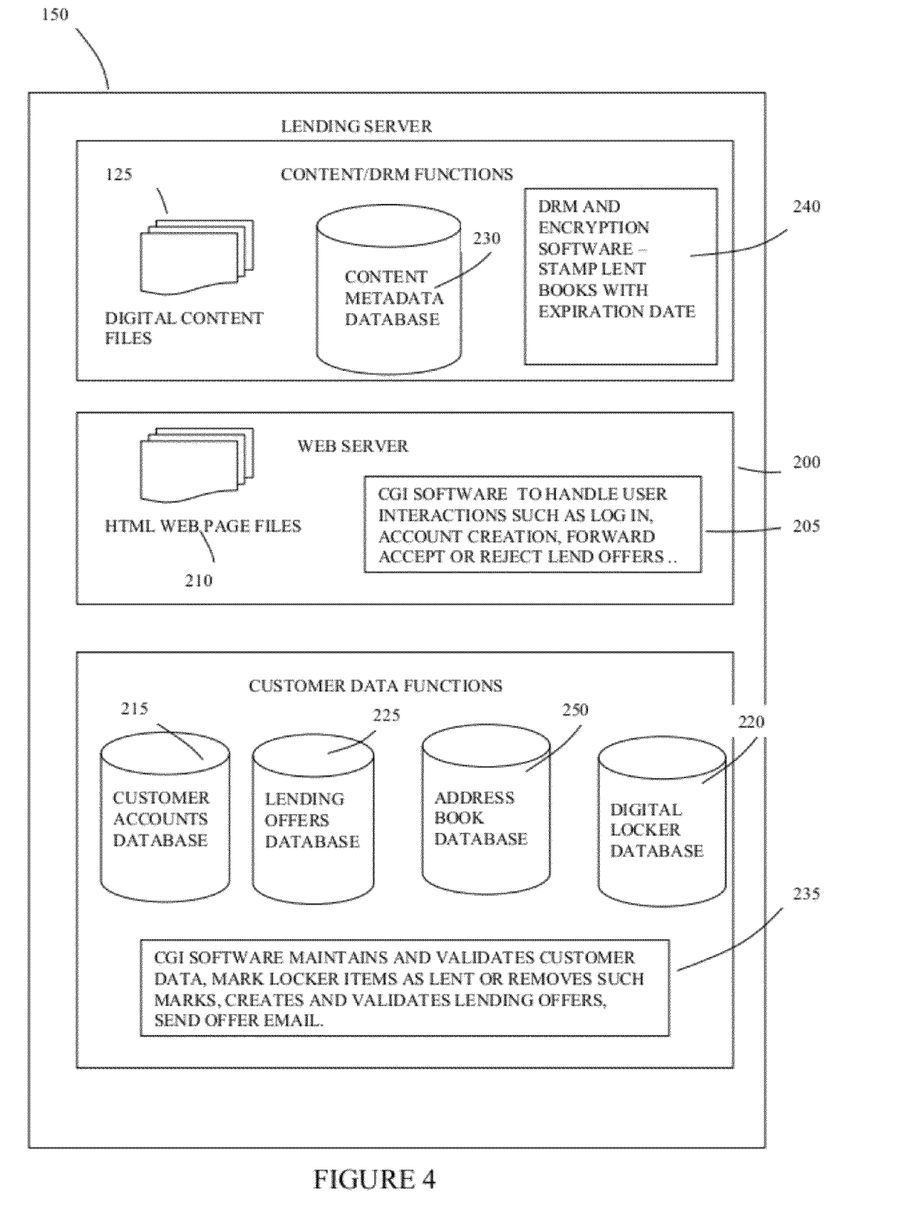
FIG. 4 illustrates a lending server according to the present invention.

FIG. 4 illustrates a block diagram of the detailed components of lending server 150 in lending system 100. Lending server 150 handles front-end functions related to web server operations and user interactions with web and device lending interfaces in connection with the users' local devices 130. Lending server 150 also handles all backend functions of lending system 100 related to managing accounts, tracking lending offers, maintaining digital locker records, maintaining content metadata and lending rights, and providing encryption and expiration services.

Lending server 150 provides both the browser based web lending interface and non-browser based device lending interface as described above. Lender 105 may engage with web lending interface or device lending interface to initiate a lending offer 110. Lending server 150 uses web lending interface as a way to present lending offer 110 to lendee 109 over the Internet 140. Lending server 150 uses the device lending interface as a way to present lending offer notification 113 directly to lendee 109 on local device 130b. Lendee 109 may engage with web lending interface or device lending interface to accept or reject lending offer 110. Lendee 109 may also engage with web lending interface or device lending interface to return lent digital content 125 prior to the expiration of the lending period of digital content 125.

Lending server 150 provides access to a web account interface for lendee 109. Lendee 109 may log into his or her account in response to receipt of a lending offer email 114 delivered to email address 111. Lending server 150 also provides access to web account interface to a party with email address 111 who receives lending offer email 114, but does not have an account in lending system 100. The party may use web account interface to create an account. Creating the account establishes the party as lendee 109 with an account and a digital locker 120 in lending system 100.

Lending server 150 employs a web server 200 including interface software 205 to handle interactions between front-end components, such as device lending interface, web account interface, and web lending interface, and back-end database components of lending system 100. Web server 200 services include serving up the web pages 210 that comprise web account interface and web lending interface, and the underlying services associated with device lending interface. Interface software 205 include handling users' logins to their accounts and processing the initiation of and response to a lending offer 110.

Back-end database components of lending system 100 include customer accounts database 215, digital lockers database 220, lending offers database 225, Address Book database 250 and content metadata database 230. Records for users' accounts are stored and managed in customer accounts database 215. Records for digital lockers 120 are stored and managed in digital lockers database 220. Records for lending offers 110 are stored and managed in lending offers database 225. Content metadata database 230 serves as a source of metadata and lending rights information for individual digital content items 125 in lending system 100. Lending rights information in content metadata database 230 indicates whether any particular digital content 125 may be lent. The address books (contacts lists) for all users are stored in address book database 250.

Web services interface software 205 in the web server 200 interfaces with customer data services 235 to update customer accounts database 215, digital lockers database 220, and lending offers database 225. Customer data services 235 processes database updates such as maintaining and validating customer data in users' accounts, marking and unmarking digital content 125 as lent in digital lockers 120, creating and validating lending offers 110, and sending lending offer notifications 113 and lending offer emails 114.

Web services interface software 205 in the web server 205 also interfaces with content encryption services 240 to secure elements of lending offers 110 and to package digital content 125 for secure delivery to lender 105 and lendee 109. Web services interface software 205 provides an encrypted security hash code as a parameter for lending offer URL as described above. Content encryption services 240 processes digital content 125 to ensure that content 125 is packaged securely for lender 105 as owner and separately packaged securely for lendee 109 when lent.

Web services interface software 205 in the web server 200 further interfaces with Digital Rights Management (DRM) services 240 and lending offers database 235 to manage lending expirations. Web services interface software 205 manages expiration setting, checking, and enforcement for lending offers 110 and the lending period for digital content 125. DRM services 240 stamps an expiration date on digital content 125 when lent to lendee 109.

In the preferred embodiment of the invention, lending system 100 is a consumer-to-consumer ebook lending system. Although the ebook application is the preferred embodiment, as appreciated by those skilled in the art, the lending system 100 of the present invention is not limited to consumer lender 105 lending only an ebook to consumer lendee 109. Lending system 100 can be used for consumer-to-consumer lending of any digital content, such as digital movies, digital music, digital audio books, digital pictures, or other downloadable digital content.

In the preferred embodiment of the invention, local devices 130a and 130b are mobile electronic reader (eReader) devices. The embodiment of the invention is not intended to limit local device 130a or local device 130b to a mobile eReader device. Local device 130a or 130b may be a desktop personal computer or another type of mobile consumer electronic device, such as, for example, a cell phone, a laptop computer, a tablet computer or other mobile digital devices.

Figure 5A:
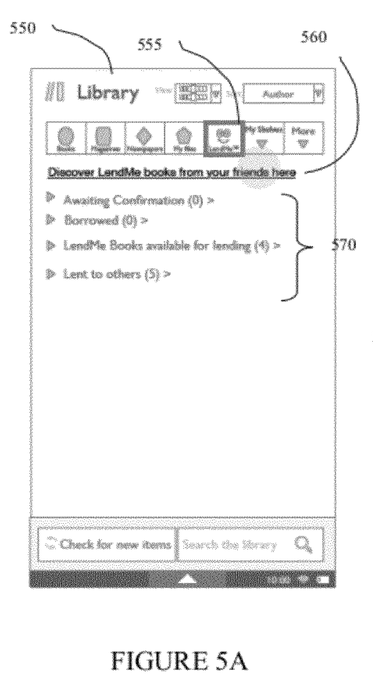
FIGS. 5A-5B depict the discoverability feature of the present invention.
Figure 5B:
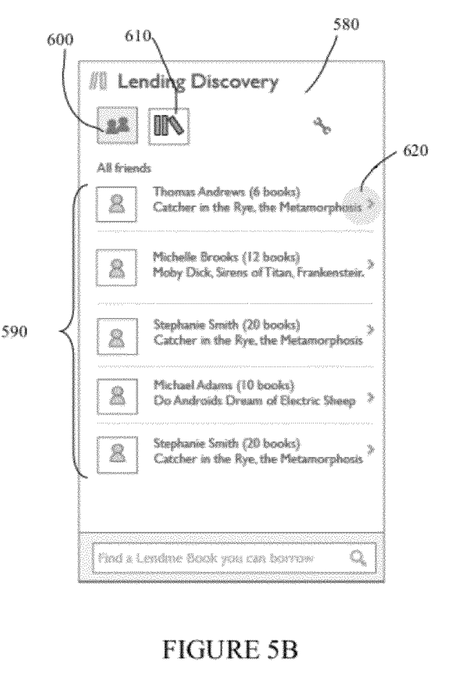

Another feature of the present invention is the ability of a registered user to discover books that are capable of being loaned by those of his contacts who are also registered users of system 100. FIGS. 5A-5B illustrate this capability. As shown in FIG. 5A, when user is viewing his library (which is a combination of the content he has purchased or have been loaned to him), there is a "LendMe" tab 555 that bring up interface 550. In area 570, the library application displays the status of all lent books. For example, it tells the user how many books she currently has loaned out, how many books she is currently borrowing and how many lending offers she has outstanding.

Interface 550 also has a selectable item 560 "Discover LendMe books from your friends here." Tapping on item 560 launches a lending discovery application and user interface 570 as illustrated in FIG. 5B. As shown in this Figure, the system identifies and lists all of the user's contacts 590 who are registered users. The system then goes through these registered users' digital lockers 120 to determine the books that the users have which are capable of being loaned. It should be noted, as described above, due to restrictions placed on books by their copyright owners (or licensors, e.g., publishers) not all books are capable of being loaned. The default view of interface 550, which can also be accessed via icon 600, is to show all the user's contacts that also have accounts with the system that have books available for lending. Icon 610 can be used by the user to display a list of books that a user can borrow from her contacts (as opposed to listing the contacts that have books to loan).

Figure 6:
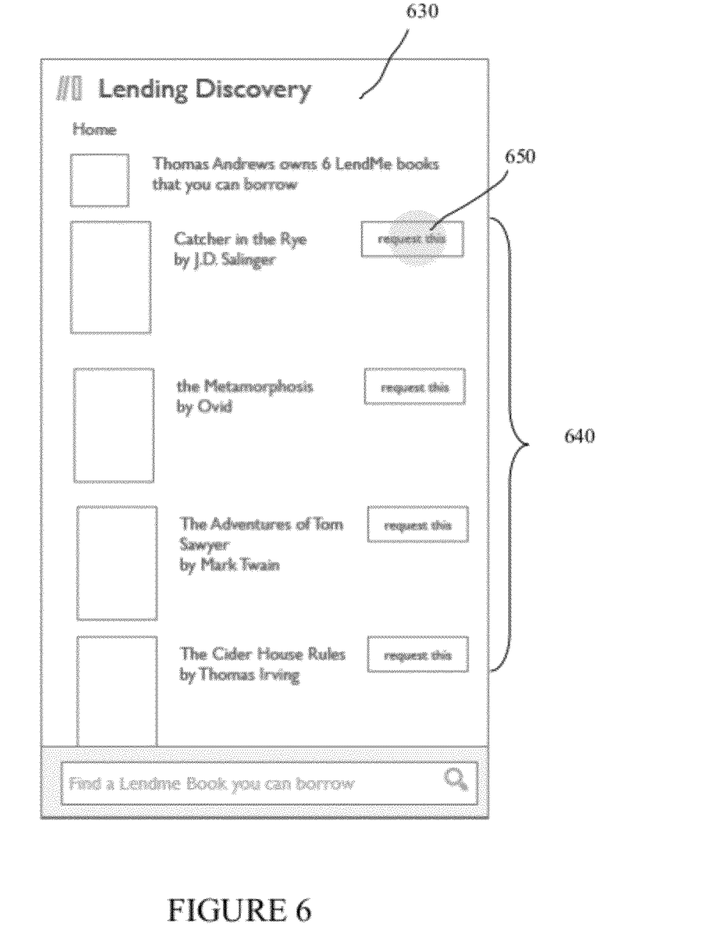
FIG. 6 illustrates the books available from a contact.

Tapping (clicking) on a particular contact's name 620 launches interface 630 as illustrated in FIG. 6 to display a list of books 640 that the selected contact has available for lending. As also shown in this Figure, if searching user finds a book he would like to borrow, he can tap a button, e.g., 650, to send a request to the contact to borrow that book. The request is sent by server 150 to the contact in the form of a notification and the contact can initiate the lending process as described above.

Figure 7A:
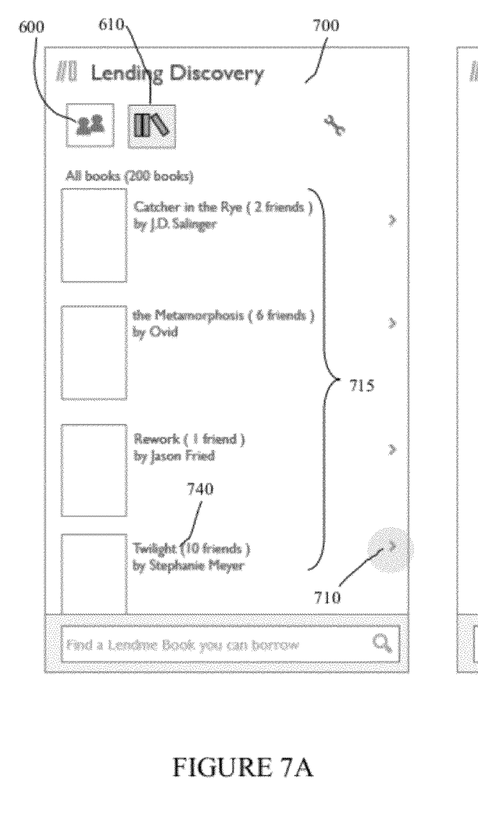
FIG. 7A-7B illustrate a list of all of the books that a user's contacts have available for lending.
Figure 7B:
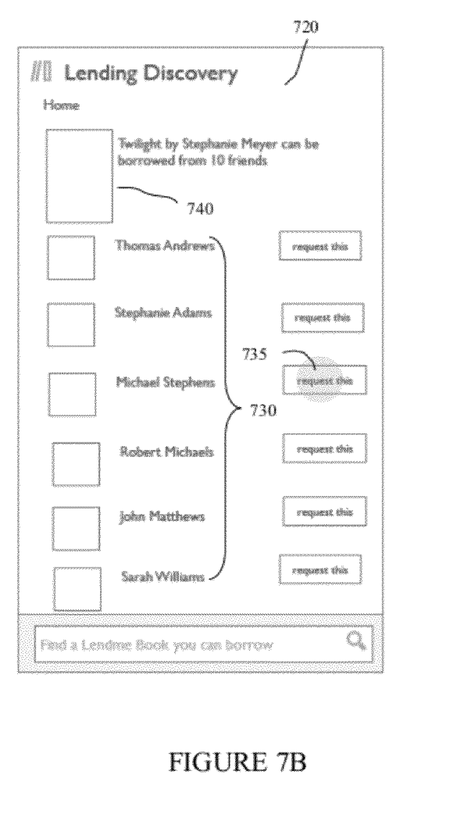

In an alternative embodiment of the present invention as illustrated in FIG. 7A-7B, the searching user can be presented in a user interface 700 with a list 715 of all of the books that his contacts have available for lending. This list 715 is generated by activating icon 610 as described above in connection with FIG. 5B. If the searching user taps on an icon 710 associated with the book 740 he wants to borrow, he will be presented in interface 720 with a list 730 of his contacts that have that particular book 740 available for borrowing as illustrated in FIG. 7B. As with the embodiment illustrated in FIG. 6B, the searching user can tap a button 735 to send a request to one of his contacts to borrow that book.

The system also allows the searching user to type in the name of the book he is looking for, and similarly, it will show a list of matching titles and his friends that have that book. As appreciated by those skilled in the art, the searching user can also search by author or subject matter or other identifying data that is typically associated with book content.

Figure 8:
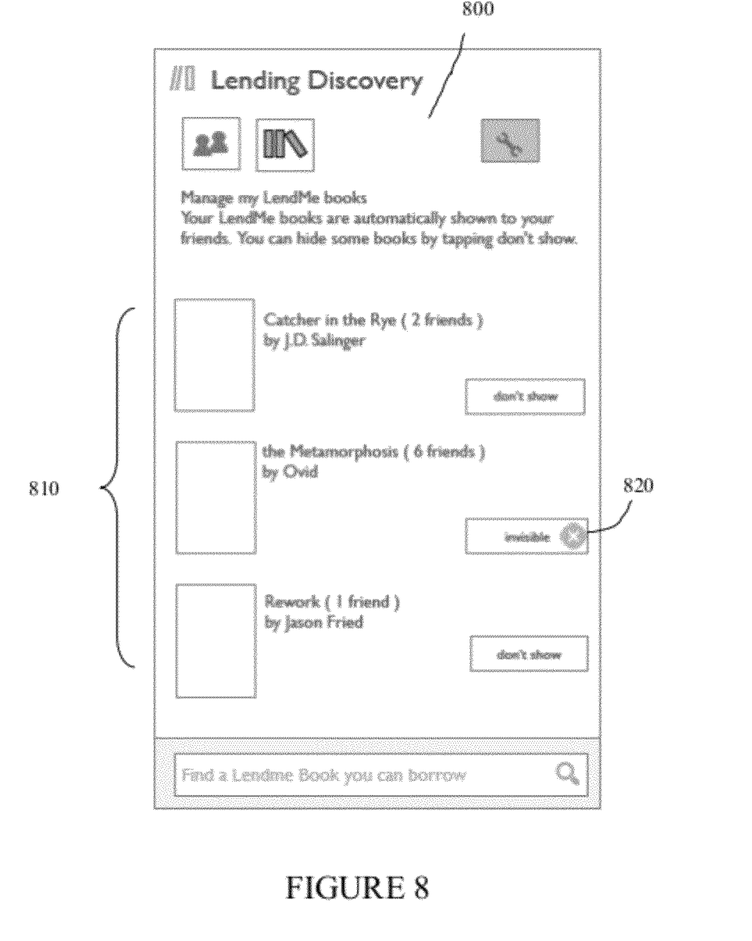
FIG. 8, depicts any books that are capable of being loaned.

To account for privacy concerns, the system of the present invention allows user to hide certain content from visibility to his contacts. A user can also completely opt out of the lending discoverability process. As shown in FIG. 8, the system can present to the user, in interface 800, a list 810 of his books that are capable of being loaned (and therefore viewed by his contacts (friends)). If the user does not want a particular book to be viewable by his friends, he simply taps a "Don't Show" button 820. The system stores this request from the user in association with user's account and thereafter will not present that book as being available for loan from the user.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A method of facilitating a loan of digital content comprising:
   receiving from a user, by a lending server, a selection of digital content to be loaned;
   presenting, by the lending server, the user with the user's contacts list;
   receiving, by the lending server, a selection of a contact from the user, the contact being a potential lendee;
   transmitting, by the lending server, a lending offer to the contact, the lending offer identifying the user and the selected digital content, the lending offer including a Uniform Resource Locator (URL) by which the contact can connect to the lending server, wherein URL contains parameters including a combination of a lending offer ID and an encrypted security hash code;
   receiving, at the lending server, an acceptance of the lending offer from the contact;
   verifying, by the lending server, that the parameters contained in the URL used by the contact matches an existing, valid, unexpired lending offer; and
   providing to the contact, by the lending server, access to the selected digital content and preventing access by the user to the selected digital content.

2. The method according to claim 1, wherein the digital content is an electronic book.

3. The method according to claim 1, further comprising:
   determining, by the lending server, identification information for the contact; and
   using, by the lending server, the identification information to transmit the lending offer to the contact.

4. The method according to claim 3, wherein the identification information is an email address of the contact.

5. The method according to claim 3, wherein the identification information is a social network user ID of the contact.

6. The method according to claim 1, wherein the lending offer includes a personal message from the user.

7. A system for facilitating the loan of digital content, comprising:
   a database server, the database server including an address book database containing users' contact lists; and
   an interface server, the interface server providing an interface between the system and a user's local device, the interface server being operable to:
   receive, from a user, a selection of digital content to be loaned,
   communicate with the database server and present the user with the user's contacts list from the address book database,
   receive a selection of a contact from the user, the contact being a potential lendee,
   transmit a lending offer to the contact, the lending offer identifying the user and the selected digital content, the lending offer including a Uniform Resource Locator (URL) by which the contact can connect to the lending server, wherein URL contains parameters including a combination of a lending offer ID and an encrypted security hash code;
   receive an acceptance of the lending offer from the contact; and
   providing the contact with access to the selected digital content, and preventing access by the user to the digital content.

8. The system according to claim 7, wherein the digital content is an electronic book.

9. The system according to claim 7, wherein the interface server communicates with the database server and is operable to determine identification information for the contact from the address book database, and
wherein the interface server uses the identification information to transmit the lending offer to the contact.

10. The system according to claim 9, wherein the identification information is an email address of the contact stored in the address book database.

11. The system according to claim 9, wherein the identification information is a social network user ID of the contact.

12. The system according to claim 7, wherein the interface server is further operable to generate the URL and generate the lending offer including the URL, wherein the URL includes an address of the system.

13. The system according to claim 12, wherein the interface server is further operable to generate the encrypted security hash code that uniquely identifies the lending offer and include the encrypted security hash code in the URL.

14. The system according to claim 7, wherein the database server further comprises a lending offer database, the lending offer database containing at least lending offers that are outstanding.

15. The system according to claim 7, wherein the database server further comprises a digital locker database, the digital locker database containing digital lockers for users, the digital lockers containing indicia of rights to digital content that users own.

16. The system according to claim 7, further comprising:
a digital rights database, wherein the digital rights database contains an indicia whether the digital content can be loaned.

17. The system according to claim 7, wherein the interface server is further operable to receive a request from the user to present a list of contacts that have digital content available for lending and present the user with the requested list of contacts, wherein the list contains the digital content that each contact has available for lending.

* * * * *